United States Patent Office 3,642,839
Patented Feb. 15, 1972

3,642,839
19-HOMO-STEROIDS
Andor Furst, Basel, Marcel Muller, Frenkendorf, and Peter Muller, Arlesheim, Switzerland, assignors to Hoffmann-La Roche Inc., Nutley, N.J.
No Drawing. Filed Jan. 8, 1970, Ser. No. 1,570
Claims priority, application Switzerland, Jan. 16, 1969, 637/69
Int. Cl. C07c *169/20*
U.S. Cl. 260—397.4      25 Claims

ABSTRACT OF THE DISCLOSURE

The invention comprises 19-homo-steroids of the formula

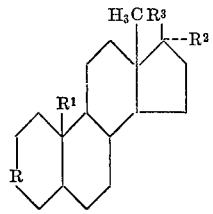

Formula I having unsaturated A and/or B rings, wherein R is a keto, alkoxy, hydroxy or acyloxy; $R^1$ is lower alkyl having at least 2 carbon atoms or lower alken-1'-yl; $R^2$ is halo-lower-alkenyl or halo-lower-alkynyl; and $R^3$ is hydroxy, acyloxy or alkoxy which compounds are useful as antigonadotrophic agents.

---

This invention relaes to 19-homo-steroids of Formula I which compounds are useful as antigonadotrophic agents.

The 19-homo-steroids of Formula I are represented by the formula

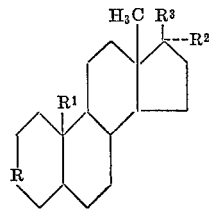

Formula I wherein R is selected from the group consisting of a 3-keto-$\Delta^4$, 3-keto-$\Delta^{4,6}$, 3-keto-$\Delta^{1,4}$, 3-keto-$\Delta^{1,4,6}$, 3-alkoxy-$\Delta^{3,5}$, 3-alkoxy-$\Delta^{3,5,7}$, 3-alkoxy-$\Delta^4$, 3-alkoxy-$\Delta^{4,6}$, 3-hydroxy-$\Delta^4$, 3-hydroxy-$\Delta^{4,6}$, 3-acyloxy-$\Delta^{3,5}$, 3-acyloxy-$\Delta^{2,4,6}$, 3-acyloxy-$\Delta^4$, 3-acyloxy-$\Delta^{4,6}$, system; $R^1$ is selected from the group consisting of lower alkyl having at least two carbon atoms and lower-alken-1'-yl; $R^2$ is selected from the group consisting of halo-lower-alkenyl and halo-lower-alkynyl; and $R^3$ is selected from the group consisting of hydroxy, acyloxy and alkoxy.

Where $R^1$ in Formula I represents lower-alkyl, the representative alkyl group can be either straight-chained or branch-chained containing anywhere from two to eight carbon atoms, e.g. ethyl, N-propyl, isopropyl, butyl, isomers thereof and the like. As noted, $R^1$ in Formula I can also represent a lower alken-1'-yl group in which case the group can likewise be either straight-chained or branch-chained containing up to eight carbon atoms. For example, the lower-alken-1'-yl group can be vinyl, buten-1'-yl, propen-1'-yl, isomers thereof and the like. In a preferred embodiment, $R^1$ will represent ethyl or propen-1'-yl.

The term halo as used herein, comprehends all of the halogens, namely, fluoro, chloro, bromo and iodo. In a preferred embodiment, halo will represent fluoro or chloro. Lower-alkenyl and lower-alkynyl each comprehend groups having up to eight carbon atoms. Where $R^2$ represents halo-lower-alkenyl, the representative lower-alkenyl group can, for example, be vinyl, allyl, methallyl, propen-1'-yl and the like; these groups can, in turn, be substituted by at least one halogen atom (e.g. trifluorovinyl, trifluoropropenyl, dichlorovinyl, dibromovinyl, etc.). Where $R^2$ represents halo-lower-alkynyl, such groups can, for example, be chloroethynyl, bromoethynyl, trifluoropropynyl, iodoethynyl, chlorobutynyl and the like. In a preferred embodiment, $R^2$ will represent trifluoropropynyl.

Suitably R and $R^3$ in Formula I each represent an acyloxy group containing the residue of a saturated aliphatic, unsaturated aliphatic or aromatic carboxylic acid either of which contain up to 10 carbon atoms, e.g., acetic acid, propionic acid, caproic acid, pivalic acid, butyric acid, valeric acid, benzoic acid and the like. Preferably, the acyloxy group contains the residue of acetic acid. Furthermore, R and $R^3$ can also each suitably represent an alkoxy group containing anywhere from one to eight carbon atoms, e.g., methoxy, ethoxy, propoxy, butoxy, pyranyloxy, isomers thereof and the like. A preferred embodiment utilizes methoxy or tetrahydropyranyloxy.

The 19-homo steroids of Formula I can be produced by a variety of methods. Firstly, the 19-homo-steroids of Formula I can be produced by reacting a compound of Formula II

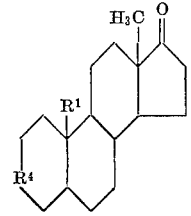

Formula II wherein $R^1$ is as above defined; and $R^4$ is selected from the group consisting of a 3-enamino-$\Delta^{3,5}$, 3-alkoxy-$\Delta^{3,5}$, 3-alkoxy-$\Delta^{3,5,7}$, 3-alkoxy-$\Delta^4$, 3-alkoxy-$\Delta^{4,6}$, 3-acyloxy-$\Delta^{3,5}$, 3-acyloxy-$\Delta^{2,4,6}$, 3-acyloxy-$\Delta^4$, or a 3-acyloxy-$\Delta^{4,6}$ system, with a Grignard reagent of the formula $R^2MgY$ or an alk-lithium compound of the formula $R^2Li$, wherein $R^2$ is as above defined and Y is a fluorine, chlorine, bromine or iodine atom; and if desired, hydrolyzing the resulting product produced therefrom.

The above reaction, which uses a Grignard reagent or an alk-lithium compound, effects the conversion of the 17-oxo group of Formula II to a tertiary alcohol group. The optional "if desired" step, comprising hydrolysis of the resulting product, is required for production of a 3-keto group where the compound of Formula II contains a 3-alkoxy, 3-enamino or 3-acyloxy group at C–3, i.e. the position represented by $R^4$.

Conversion of the 17-oxo group of a compound of Formula II into a tertiary alcohol group can be effected according to conventional techniques using, for example, the Grignard reagent or an alk-lithium compound described herein. The reaction which converts a compound of Formula II to a compound of Formula I is suitably conducted in the presence of an ether solvent (e.g. diethyl ether, tetrahydrofuran, dioxane, etc.). The hydrolysis of the 3-enamino, 3-enol ether or 3-enol ester group of the resulting product is suitably accomplished using an acid (e.g. acetic, dil. hydrochloric, etc.) to produce a compound of Formula I having a 3-keto-$\Delta^4$ or 3-keto-$\Delta^{4,6}$ system.

Grignard reagents of the formula $R^2MgY$ (wherein $R^2$ and Y are as above described) can be prepared in a conventional manner using an alkyl magnesium halide (e.g. ethyl magnesium bromide) and a haloalkynyl or haloalkenyl compound. Alk-lithium compounds can be prepared in a conventional manner reacting an alkyl-lithium compound (e.g. methyl lithium, butyl lithium, etc.) with a halo-alkynyl or halo-alkenyl compound such as chloroacetylene, trifluoropropyne, dichloroethylene, dibromoethylene and the like. Either of these alk-lithium compounds can be reacted in situ with a steroid of Formula II.

Alternately, the 19-homo-steroids of Formula I can be prepared by dehydrogenating a compound of Formula III

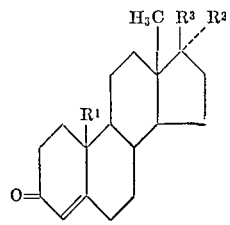

Formula III in the 1(2) and/or 6(7) position. A 1(2)-dehydrogenation can be effected using selenium dioxide in amyl alcohol or with a benzoquinone (e.g. dichlorodicyanobenzoquinone) in benzene or in dioxane containing a small amount (about 0.1–1%) of a mineral acid. Similarly, a 6(7)-dehydrogenation can be effected using a benzoquinone or chloranil in dioxane containing about 1 to 10% of a mineral acid. The introduction of a double bond at the 6(7) position can also be effected by reacting a compound of Formula I, having a 3-alkoxy-$\Delta^{3,5}$ system, with dichlorodicyanobenzoquinone in water containing an organic solvent such as 95% acetone or dioxane.

Thirdly, the 19-homo-steroids of Formula I can be prepared by enol-esterifying or enol-etherifying a compound of Formula III or a 6(7)-dehydro derivative thereof. For example, a compound of Formula III (or a 6(7) dehydro derivative thereof) can be reacted with an acylating agent (e.g. isopropenyl acetate) in the presence of a catalyst (e.g. toluene-sulfonic acid) to produce 19-homo-steroids of Formula I having a 3-acyloxy-$\Delta^{3,5}$ or 3-acyloxy-$\Delta^{2,4,6}$ system.

A fourth procedure for preparing the 19-homo-steroids of Formula I comprises acylating or alkylating a 19-homo-steroid of Formula I having a free hydroxy group at C–3 or C–17. The acylation of a free hydroxy group at C–3 or C–17 can be effected using a reactive acyl derivative such as an acyl anhydride or halide in the presence of a base like pyridine.

Alkylation of an unprotected hydroxy group at C–3 can be effected by reacting a steroid of Formula I with an alcohol containing the particular alkyl group to be introduced or with a dialkoxypropane (e.g. 2,2-dimethoxypropane) in methanol/dimethyl formamide. The reaction by either of the two methods suitably proceeds in the presence of a catalyst such as p-toluenesulfonic acid. The alkylation at C–3 can also be effected using an orthoformic acid ester in the presence of an acid (e.g. hydrochloric acid).

Alkylation of an unprotected hydroxy group at C–17 can be effected by converting the steroid of Formula I into its corresponding metal salt. This conversion is accomplished by first reacting the steroid with, for example, sodium amide or lithium amide and then secondly with an alkyl iodide. This two-step reaction protects the optionally present keto group at C–3 by its formation of a ketal or enolether. For example, reacting a steroid of Formula I, having a hydroxy at C–3, with dihydropyran in the presence of p-toluenesulfonic acid produces a tetrahydropyranyl ether.

Fifthly, the compounds of Formula I, wherein R is a 3-keto $\Delta^4$, or 3-keto-$\Delta^{4,6}$, system can be prepared by reducing a keto group to a hydroxy group at C–3 in a 19-homo-steroid of Formula I, to a hydroxy group. The reduction can be effected with reducing agents such as complex metal hydrides; preferably, lithium aluminum hydride or sodium borohydride is utilized.

A further and sixth process for producing the 19-homo-steroids of Formula I comprises reacting a compound of Formula IV

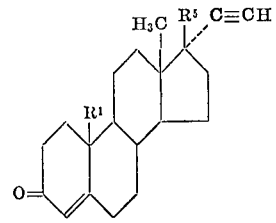

Formula IV wherein $R^1$ is as above defined, and $R^5$ is selected from the group consisting of acyloxy and alkoxy, with a strong base and treating the resulting metal salt with a reagent which yields a positive halogen atom(s). Suitable strong bases for preparing the metal salt, are for example, lithium amide, sodium amide and the like. Reagents comprehended as yielding a positive halogen atoms(s) are, for example, chlorine, bromine, N-chloro-or N-bromo-amides (e.g. N-chloro-or), N-bromo-amides (e.g. N-chlorosuccinimed), trifluorobromomethane-hept fluoro-1-iodo-propane and the like.

An alternate and seventh process for preparing the 19-homo-steroids of Formula I comprises reacting a compound of Formula V

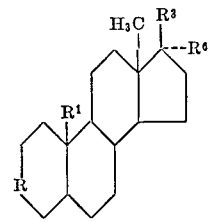

Formula V wherein R, $R^1$, and $R^3$ are each as above defined, and $R^6$ is di-halo (lower alkenyl), with a strong base so to split-off a hydrogen halide from said steroid of Formula V. As applied to this process, the term strong base comprehends that base which can split-off a hydrogen halide from a dihaloalkenyl side-chain of a compound of Formula V with the resultant formation of a haloalkynyl grouping; for example, potassium tert-butylate, trimethylbenzylammonium hydroxide and the like.

The last of nine processes for preparing the 19-homo-steroids of Formula I comprises hydrogenating the halo-lower-alkynyl group of a compound of Formula VI

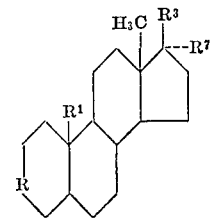

Formula VI wherein R, $R^1$, and $R^3$ are each as above defined, and $R^7$ is halo(lower-alkynyl), to the corresponding halo-lower-alkenyl group.

Hydrogenation of a haloalkynyl side-chain in a compound of Formula VI can, for example, be carried out using hydrogen in the presence of a catalyst (e.g. palladium/calcium carbonate, deactivated palladium etc.) until about 1 mol of hydrogen is reacted.

The 19-homo-steroids of Formula I are useful compounds evidencing differentiated hormonal activity. These 19-homo-steroids of Formula I are especially useful as anti-gonadotropic agents. This hormonal activity demonstrated in the following procedure: 21-day old male rats were each administered 4 mg. a 19-homo-steroid of Formula I subcutaneously for 6 days. The weights of the testicles and ventral prostates of each animal were subsequently compared to the weights obtained from untreated control animals. The relative decrease in weight of the organs of the treated animals represents a measure of the anti-gonadotropic activity of the steroids administered. The values obtained for specific 19-homo-steroids are expressed as a percentage and are set-forth in Table I. The mean value of the organ weights, as a percentage, was calculated using the following formula wherein $\overline{X}$ represents the mean value of the weight of the organs of the animals.

$$\frac{\overline{X} \text{ Treated Animals}}{\overline{X} \text{ Untreated Animals}} \cdot 100 = \text{Percent } (\%)$$

The 19-homo-steroids of Formula I evidence therapeutic usefulness as compounds and can be used in many pharmaceutical preparations. For example, the compounds can be combined with many pharmaceutically acceptable inert carriers to prepare pharmaceutical preparations suitable for enteral, percutaneous and/or parenteral applications. As used herein, pharmaceutically acceptable inert carriers comprehend organic and inorganic materials such as water, gelatin, gum arabic, lactose, starches, magnesium stearate, talc, vegetable oils, polyalkyleneglycols, petroleum jelly, and the like. These pharmaceutical preparations can also contain other therapeutically valuable substances, and can be in several forms such as solid form (e.g. tablets, dragees, suppositories, capsules, etc.); semi-solid form (e.g. ointments, creams, etc.); or in liquid form (e.g. solutions, suspensions, emulsions, etc.). Each pharmaceutical preparation can be sterilized and/or contain additives such as preservatives, stabilizers, wetting or emulsifying agents, buffering salts and osmotic pressure varying salts. The amount of compound of Formula I administered should be adjusted by the individual administering it to suit the particular situation. The following examples are given to illustrate the invention.

TABLE I

| Administered 19-homo-steroid of Formula I | Testicles | Prostate |
|---|---|---|
| 19-methylene-21-chloro-17-hydroxy-17α-pregna-1,4-dien-20-yn-3-one | 56 | 32 |
| 19-methylene-21-chloro-17-hydroxy-17α-pregna-4,6-dien-20-yn-3-one | 50 | 38 |
| Cis-19-ethylidene-21-chloro-17-hydroxy-17α-pregn-4-en-20-yn-3-one | 56 | 34 |
| Trans-19-ethylidene-21-chloro-17-hydroxy-17α-pregn-4-en-20-yn-3-one | 44 | 33 |
| Cis-19-ethylidene-21-chloro-17-hydroxy-17α-pregna-4,6-dien-20-yn-3-one | 48 | 29 |
| Cis-19-ethylidene-17β-hydroxy-16(trifluoro-1-propynyl)-andorst-4-en-3-one | 58 | 40 |
| 19-ethyl-21-chloro-17-hydroxy-17α-pregna-1,4-dien-20-yn-3-one | 49 | 42 |

EXAMPLE 1

Preparation of: 19-ethyl-21-chloro-17-hydroxy-17α-pregn-4-en-20-yn-3-one 50 ml. of 2,2-dimethoxypropane, 2 ml. of methanol and 260 mg. of p-toluenesulphonic acid are added to a solution of 10 g. of 19-ethylandrost-4-ene-3,17-dione in 50 ml. of dimethylformamide. The reaction mixture is boiled at reflux for 2 hours under an argon atmosphere. After cooling, the reaction mixture is reacted with 2 g. of sodium bicarbonate and then poured into a large amount of water and extracted with ether that contains a small amount of pyridine. The ethereal extract is thereupon washed twice with water and dried over anhydrous potassium carbonate. Evaporation from ethanol yielded: 19-ethyl-3-methoxyandrosta-3,5-dien-17-one.

A solution of 6.15 g. of cis-dichloroethylene in 40 ml. of ether is added dropwise to 61 ml. of a 1.68 N solution of methyl-lithium over a period of one hour at 0° C. and under an argon atmosphere. The reaction mixture is then stirred at room temperature for two hours, and a solution of 2.16 g. of 19-ethyl-3-methoxy-androsta-3,5-dien-17-one in 50 ml. of ether is thereafter added dropwise. The resulting reaction mixture is stirred at room temperature for an additional 2 hour period, cooled to 0° C. and reacted with a 50 ml. solution of saturated ammonium chloride. The reaction mixture is then extracted with ether, the ethereal phase washed with a saturated sodium chloride solution, dried over sodium sulphate and evaporated. The residue is thereupon dissolved in 40 ml. of dioxane, reacted with a mixture of 2 ml. of conc. hydrochloric acid and 2 ml. of water and stirred at room temperature under an argon atmosphere for 2 hours. The solution is thereafter poured into ice-water and extracted with ether. Chromatography of the product on silica gel with hexane/ether (1:1) yielded: 19-ethyl-21-chloro-17-hydroxy-17α-pregn-4-en-20-yn-3-one. M.P. 162–164°.

EXAMPLE 2

Preparation of: cis-19-ethylidene-21-chloro-17-hydroxy-17α-pregn-4-en-20-yn-3-one Using the procedure secondly described in Example 1, cis-19-ethylidene - 3 - methoxyandrosta-3,5-dien-17-one (M.P. 118° C.) was prepared from 2,2-dimethoxypropane, methanol, p-toluenesulfonic acid and cis-19-ethylideneandrost-4-one-3,17-dione.

Using the procedure first described in Example 1, cis-19-ethylidene - 21 - chloro-17-hydroxy-17α-pregn-4-en-20-yn-3-one was prepared from cis-dichloroethylene in ether, methyl-lithium and cis-19-ethylidene-3-methoxyandrosta-3,5-dien-17-one. M.P. 165°–166° C. (crystallized from methylene chloride/ether). UV: $\epsilon_{243}=13,900$; $[\alpha]_{589}=+26°$ (c.=0.1 in dioxane).

EXAMPLE 3

Preparation of: trans-19-ethylidene-21-chloro-17-hydroxy-17α-pregn-4-en-20-yn-3-one 10 g. of cis-19-ethylideneandrost-4-ene-3,17-dione is boiled at reflux for 4 hours with 5 g. of anhydrous sodium acetate, 2 g. of 5% palladium-charcoal in 150 ml. of abs. ethanol and a 1% solution of cyclohexene in ethanol. The cyclohexene solution is added dropwise at the rate of 40 ml. per hour. The reaction mixture is then cooled and filtered, the filtrate of which is further reacted with 100 ml. of water and evaporated to a volume of about 200 ml. and then, at the boiling temperature, reacted with water until the mixture is slightly turbid. Cooling yielded crystalline trans-19-ethylideneandrost-4-ene-3,17-dione M.P. 174–175° C. (from methylene chloride/ether). UV: $\epsilon_{238}=15,400$; $[\alpha]_{589}=+219°$ (c.=0.1 in dioxane).

Usin the procedure secondly described in Example 1, trans-19-ethylidene-3-methoxyandrosta-3,5-dien - 17 - one wasprepared from 2,2 - dimethoxypropane, methanol, p-toluenesulfonic acid and trans-19-ethylideneandrost-4-ene-3,17-dione.

Using the procedure first described in Example 1, trans-19-ethylidene-21-chloro - 17 - hydroxy-17α-pregn-4-en-20-yn-3-one was prepared from cis-dichloroethylene in ether, methyl-lithium and trans - 19 - ethylidene-3-methoxyandrosta-3,5-dien-17-one. M.P. 162°–164° C. (crystallized from ether/hexane). UV: $\epsilon_{238}=15,950$; $[\alpha]_{589}=+44°$ (c.=0.1 in dioxane).

EXAMPLE 4

Preparation of: 19-methylene-21-chloro-17-hydroxy-17α-pregn-4-en-20-yn-3-one

Using the procedure secondly described in Example 1, 19-methylene - 3 - methoxyandrosta-3,5-dien-17-one was prepared from 2,2-dimethoxypropane, methanol-p-toluenesulfonic acid and 19-methyleneandrost-4-ene-3,17-dione.

Using the procedure first described in Example 1, 19-methylene-21-chloro - 17 - hydroxy-17α-pregn-4-en-20-yn-3-one was prepared from cis-dichloroethylene in ether, methyl-lithium and 19-methylene-3-methoxyandrosta-3,5-dien-17-one. M.P. 133°–134° C. (crystallized from isopropyl ether); UV: $\epsilon_{240}=16,000$; $[\alpha]_{589}=+27°$ (c.=0.1 in dioxane).

EXAMPLE 5

Preparation of: cis-19-ethylidene-17β-hydroxy-17-(trifluoro-1-propynyl)-androst-4-en-3-one A Grignard solution is effected in the conventional manner i.e., from 2.43 g. magnesium and 10.9 g. ethyl bromide in 170 ml. of tetrahydrofuran in an argon atmosphere.

A solution of 18.8 g. of trifluoropropyne in 100 ml. of tetrahydrofuran is added dropwise to the Grignard solution at 0° C. and stirred at room temperature for 1 hour. A solution of 6.5 g. of cis-19-ethylidene-3-methoxyandrosta-3,5-dien-17-one in 100 ml. of tetrahydrofuran is then added and the reaction mixture boiled at reflux for 2 hours. After cooling to 0° C. the mixture is reacted with a 100 ml. solution of saturated ammonium chloride. The resulting reaction mixture is thereafter extracted with methylene chloride, the extract washed until neutral, dried and the solvent evaporated. The enol-ether thus obtained is hydrolyzed in hydrochloric acid dioxane as first described in Example 1. Chromatography on silica gel with hexane/acetone (9:1) yielded: cis-19-ethylidene-17β-hydroxy - 17 - (trifluoro-1-propynyl)-androst-4-en-3-one. M.P. 235°–237° C. (crystallized from ether-hexane). UV: $\epsilon_{243}=15,000$, $[\alpha]_{589}=+45°$ (c.=0.1 in dioxane).

EXAMPLE 6

Preparation of: cis-19-ethylidene-21-chloro-17-hydroxy-17α-pregna-1,4-dien-20-yn-3-one A solution of 104 g. of cis-19-ethylidene-21-chloro-17-hydroxy-17α-pregn-4-en-20-yn-3-one in 500 ml. of benzene is reacted with 7.35 g. of dichlorodicyanobenzoquinone and boiled at reflux under an argon atmosphere for 48 hours. After cooling, the reaction mixture is filtered over 200 g. of aluminum oxide (activity II), and rinsed with acetic ester. Extraction and chromatography of the extract on a 100-fold quantity of silica gel with cyclohexane/acetic ester (4:1) yielded: cis-19-ethylidene-21-chloro-17-hydroxy-17α-pregna-1,4-dien-20-yn-3-one. M.P. 233°–234° C. (crystallized methylene chloride/ether); UV: $\epsilon_{252}=15,000$; $[\alpha]_{589}=-100°$ (c.=0.1 in dioxane).

EXAMPLE 7

Preparation of: trans-19-ethylidene-21-chloro-17-hydroxy-17α-pregna-1,4-dien-20-yn-3-one Using the procedure described in Example 6 trans-19-ethylidene-21-chloro - 17 - hydroxy-17α-pregna-1,4-dien-20-yn-3-one was prepared from dichlorodicyanobenzoquinone and trans-19-ethylidene-21-chloro-17-hydroxy-17α-pregn-4-en-20-yn-3-one in benzene. M.P. 168°–170° C. (crystallized from ether/hexane); UV: $\epsilon_{245}=14,400$; $[\alpha]_{589}=-61°$ (c.=0.1 in dioxane).

EXAMPLE 8

Preparation of: 19-methylene-21-chloro-17-hydroxy 17α-pregna-1,4-dien-20-yn-3-one Using the procedure described in Example 6, 19-methylene-21-chloro-17-hydroxy-17α-pregna - 1,4 - dien-20-yn-3-one was prepared from dichlorodicyanobenzoquinone and 19-methylene-21-chloro-17-hydroxy - 17α - pregn-4-en-20-yn-3-one in benzene. M.P. 196°–197° C. (crystallized from acetone/hexane); UV: $\epsilon_{245}=148,000$; $[\alpha]_{589}=-48°$ (c.=0.1 in dioxane).

EXAMPLE 9

Preparation of: 19-ethyl-21-chloro-17-hydroxy-17α-pregna-1,4-dien-20-yn-3-one

Using the procedure described in Example 6, 19-ethyl-21-chloro-17-hydroxy - 17α - pregna-1,4-dien-20-yn-3-one was prepared from dichlorodicyanobenzoquinone and 19-ethyl-21-chloro-17-hydroxy - 17α - pregn-4-en-20-yn-3-one in benzene. M.P. 202°–203° C. (crystallized from acetone/hexane); UV: $\epsilon_{247}=15,400$; $[\alpha]_{589}=-43°$ (c.=0.1 in dioxane).

EXAMPLE 10

Preparation of: cis-19-ethylidene-17β-hydroxy-17-(trifluoro-1-propynyl)-androsta-1,4-dien-3-one Using the procedure described in Example 6, cis-19-ethylidene-17β-hydroxy-17-(trifluoro - 1 - propynyl)-androsta-1,4-dien-3-one was prepared from dichlorodicyanobenzoquinone and cis - 19 - ethylidene - 17β - hydroxy-17 (trifluoro-1-propynyl)-androst-4-en-3-one-in benzene M.P. 218°–219° C. (crystallized from ether/hexane); UV: $\epsilon_{250}=15,200$; $[\alpha]_{589}=-90°$ (c.=0.1 in dioxane).

EXAMPLE 11

Preparation of: cis - 19 - ethylidene - 21 - chloro-17-hydroxy-17α-pregna-4,6-dien-20-yn-3-one A solution of 3.6 g. of cis-19-ethylidene-21-chloro-17-hydroxy-17α-pregn-4-en-20-yn-3-one in 125 ml. of dioxane and containing 6.5% of hydrogen chloride is added dropwise to a solution of 2.6 of dichlorodicyanobenzoquinone in 125 ml. of dioxane containing 6.5% of hydrogen chloride over a 3 minute period and under an argon atmosphere. The mixture is stirred at room temperature for an additional 7 minutes whereupon 45 g. of solid sodium bicarbonate is added in small portions. The mixture is then further stirred for 15 minutes, treated wtih 250 ml. of benzene and filtered. The filtrate is filtered over 70 g. of aluminum oxide (activity II), and rinsed with acetic ester. Evaporation of the extract and chromatography on a 50-fold quantity of silica gel with hexane/acetone (9:1), yielded: cis-19-ethylidene - 21 - chloro-17-hydroxy-17α-pregna - 4,6 - dien - 20 - yn-3-one. M.P. 144°–145° C.; UV $\epsilon_{285}=22,600$; $[\alpha]_{589}=-22°$ (c.=0.1 in dioxane).

EXAMPLE 12

Preparation of: cis-19-ethylidene-17β-hydroxy-17-(trifluoro-1-propynyl)-androsta-4,6-dien-3-one Using the procedure described in Example 11, cis-19-ethylidene-17β-hydroxy - 17 - (trifluoro - 1 - propynyl)-androsta-4,6-dien-3-one was prepared from dichlorodicyanobenzoquinone in dioxane containing hydrogen chloride and cis-19-ethylidene-17β-hydroxy-17-(trifluoro-1-propynyl)-androst - 4 - en-3-one in dioxane containing hydrogen chloride. M.P. 254°–256° C.; UV: $\epsilon_{284}=24,600$; $[\alpha]_{589}=20°$ (c.=0.1 in dioxane).

EXAMPLE 13

Preparation of: trans-19-ethylidene-21-chloro-17-hydroxy-17α-pregna-4,6-dien-20-yn-3-one Using the procedure described in Example 11, trans-19 - ethylidene-21-chloro-17-hydroxy-17α-pregna-4,6-dien-20-yn-3-one was prepared from dichlorodicyanobenzoquinone in dioxane containing hydrogen chloride and trans-19-ethylidene - 21 - chloro-17-hydroxy-17α-pregn-4-en-20-yn-3-one in dioxane containing hydrogen chloride. M.P. 196°–197° C. (crystallized from acetone/hexane); UV: $\epsilon_{284}=24,400$; $[\alpha]_{589}=-67°$ (c.=0.08 in dioxane).

EXAMPLE 14

Preparation of: 19-methylene-21-chloro-17-hydroxy-17α-pregna-4,6-dien-20-yn-3-one Using the procedure described in Example 11, 19-methylene-21-chloro-17-hydroxy - 17α - pregna-4,6-dien-20-yn-3-one was prepared from dichlorodicyanobenzoquinone in dioxane containing hydrogen chloride and 19-methylene-21-chloro - 17 - hydroxy-17α-pregn-4-en-20-yn-3-one in dioxane containing hydrogen chloride. M.P. 137°–139° C. (crystallized from acetone/hexane); UV: $\epsilon_{286}=26,100$; $[\alpha]_{589}=-85°$ (c.=0.1 in dioxane).

EXAMPLE 15

Preparation of: cis-19-ethylidene-21-chloro-17-hydroxy-17α-pregna-1,4,6-trien-20-yn-3-one A solution of 1.1 g. of cis-19-ethylidene - 21 - chloro-17-hydroxy - 17α - pregna-4,6-dien-20-yn-3-one in 50 ml. of dioxane, containing 0.2% of hydrogen chloride, is reacted with 0.87 g. of dichlorodicyanobenzoquinone under an argon atmosphere and stirred at room temperature for 24 hours. Sodium bicarbonate (3 g.) is then added and the reaction mixture boiled at reflux for 1 hour. The mixture is cooled after dilution with 50 ml. of benzene and the resultant product is filtered. The filtrate is then further filtered over a 30-fold quantity of aluminum oxide (activity II) and rinsed with acetic acid ester. Evaporation of the extract yielded: cis - 19 - ethylidene-21-chloro-17-hydroxy-17α-pregna - 1,4,6, - trien-20-yn-3-one. M.P. 211°–212° C. (crystallized from acetone/hexane); UV: $E_{225}=11,800$; $E_{265}=9,950$; $\epsilon_{302}=9,950$; $[\alpha]_{589}= -178°$ (c.=0.1 in dioxane).

EXAMPLE 16

Preparation of: trans-19-ethylene-21-chloro-17-hydroxy-17α-pregna-1,4,6-trien-20-yn-3-one Using the procedure described in Example 15, trans-19-ethylene-21-chloro - 17 - hydroxy-17α-pregna-1,4,6-trien-20 - yn - 3-one, was prepared from dichlorodicyanobenzoquinone and trans-19-ethylidene 21-chloro - 17 - hydroxy-17α-pregna-4,6-dien - 20 - yn-3-one in dioxane containing hydrogen chloride. M.P. 242°–244° C. (crystallized from acetone/hexane); UV: $\epsilon_{223}=13,100$; $\epsilon_{255}=8,940$; $\epsilon_{302}=10,800$; $[\alpha]_{589}=258°$ (c.=0.1 in dioxane).

EXAMPLE 17

Preparation of cis-19-ethylidene-17β-hydroxy-17-(trifluoro-1-propynyl)-androsta-1,4,6-trien-3-one Using the procedure described in Example 15, cis-19-ethylidene - 17β - hydroxy - 17 - (trifluoro-1-propynyl)-androsta-1,4,6-trien-3-one was prepared from dichlorodicyanobenzoquinone and cis-19-ethylidene-17β-hydroxy-17-(trifluoro-1-propynyl) - androsta-4,6-dien-3-one in dioxane containing hydrogen chloride. M.P. from 260° C. dec. (crystallized from acetone/hexane); UV: $\epsilon_{225}=11,140$, $\epsilon=9,200$, $\epsilon_{302}=9,450$; $[\alpha]_{589}=-130°$ (c.=0.1 in dioxane).

EXAMPLE 18

Preparation of: 19-methylene-21-chloro-17-hydroxy-17α-pregna-1,4,6-trien-20-yn-3-one Using the procedure described in Example 15, 19-methylene-21-chloro-17-hydroxy - 17α - pregna - 1,4,6-trien-20-yn-3-one was prepared from dichlorodicyanobenzopuinone and 19-methylene-21-chloro 17-hydroxy-17α-pregna-4,6-dien-20-yn-3-one in dioxane containing hydrogen chloride. P.M. 159–160° C. (crystallized from acetone/hexane); UV: $\epsilon_{227}=11,850$; $\epsilon_{260}=8,730$; $\epsilon_{303}=11,500$; $[\alpha]_{589}=-240°$.

EXAMPLE 19

Preparation of: 19-ethyl-21-chloro-17-hydroxy-17α-pregna-4,6-dien-20-yn-3-one

A solution of 8.92 g. of cis-dichloroethylene in 60 ml. of ether to 130 ml. of 1.2 N methyl-lithium solution is added dropwise over a one hour period and under an argon atmosphere. The reaction mixture is stirred at room temperature for 2 hours and a solution of 3 g. of 19-ethyl-3-methoxyandrosta-3,5-dien-17-one in 55 ml. of ether is added dropwise. The resulting mixture is stirred at room temperature for an additional 2 hours, cooled to 0° C., decomposed with a saturated ammonium chloride solution and extracted with ether. The ethereal phase is washed with a saturated sodium chloride solution, dried over sodium sulphate and the solvent evaporated. The residue, of 19-ethyl-21-chloro-17-hydroxy-3-methoxy-17α-pregna-3,5-dien-20-yne, is dissolved in 260 ml. of 95% dioxane and treated within 2 minutes with a solution of 2.32 g. of dichlorodicyanobenzoquinone in 70 ml. of 95% dioxane. A further 70 ml. of dioxane is added and, after 2 minutes, 300 ml. of benzene is also added. The reaction mixture is filtered over 250 g. of Alox. Chromatography on a 100-fold quantity of Kieselgel with methylene chloride/acetone (98:2) yielded: 19-ethyl-21-chloro-17-hydroxy-17α-pregna-4,6-dien-20-yn-3-one. M.P. 212°–214° C. (crystallized from acetone/hexane); UV: $\epsilon_{285}=25,500$; $[\alpha]_{589}=-114°$ (c.=0.1 in dioxane).

EXAMPLE 20

Preparation of: 19-ethyl-21-chloro-17-hydroxy-17α-pregna-1,4,6-trien-20-yn-3-one Using the procedure described in Example 15, 19-ethyl-21 - chloro-17 - hydroxy-17α - pregna-1,4,6-trien-20-yn-3-one was prepared from dichlorodicyanobenzoquinone and 19-ethyl-21 - chloro-17 - hydroxy-17α - pregna-4,6-dien-20-yn-3-one in dioxane containing hydrogen chloride. M.P. 262°–265° C. (crystallized from acetone/hexane); $[\alpha]_{589}=-221°$ (c.=0.1 in dioxane).

EXAMPLE 21

Preparation of: 19-methyl-21-chloro-17-hydroxy-17α-pregna-4-en-20-yn-3-one

Using the procedure secondly described in Example 1, 19-methyl-3 - methoxyandrosta-3,5 - dien-17-one was prepared from 2,2-dimethoxypropane, methanol, p-toluenesulfonic acid and 19-methylandrost-4-en-3,17-dione.

Using the procedure first described in Example 1, 19-methyl-21-chloro-17-hydroxy-17α-pregn-4-en-20-yn-3-one was prepared from cis-dichloroethylene in ether, methyllithium and 19-methyl-3-methoxyandrosta-3,5-dien-17-one in ether. M.P. 161°–162° C. (crystallized from acetone/hexane). UV: $\epsilon_{242}=16,200$; $[\alpha]_{589}=-49°$ (c.=0.1 in dioxane).

EXAMPLE 22

Preparation of: 19-methyl-21-chloro-17-hydroxy-17α-pregna-1,4-dien-20-yn-3-one

Using the procedure described in Example 6, 19-methyl-21 - chloro-17 - hydroxy-17α - pregna-1,4 - dien-20-yn-3-one was prepared from dichlorodicyanobenzoquinone and 19-methyl-21-chloro-17-hydroxy-17α-pregn-4-en-20-yn-3-one in benzene. M.P. 214°–215° C. (crystallized from acetone/hexane); UV: $\epsilon_{245}=15,700$; $[\alpha]_{589}=-50°$ (c.=0.1 in dioxane).

EXAMPLE 23

Preparation of: 19-methyl-21-chloro-17-hydroxy-17α-pregna-4,6-dien-20-yn-3-one

Using the procedure described in Example 19, 19-methyl-21-chloro-17-hydroxy-17α-pregna-4,6 - dien-20 - yn-3-one was prepared from cis-dichloroethylene, methyllithium and 19 - methyl-2-methoxy-androsta-3,5-dien-17-one. M.P. 146°–147° C.; UV: $\epsilon_{284}=23,800$; $[\alpha]_{589}=-120°$ (c.=0.1 in dioxane).

EXAMPLE 24

Preparation of: cis-19-ethylidene-21-bromo-17-methoxy-17α-pregn-4-en-20-yn-3-one Using the procedure secondly described in Example 1, cis-19 - ethylidene-17 - hydroxy-3 - methoxy-17α-pregna-3,5-dien-20-yne is prepared from 2,2-dimethoxypropane, methanol, p-toluenesulfonic acid and cis-19-ethylidene-17-hydroxy-17α-pregn-4-en-yn-3-one.

1.2 g. of sodium is dissolved in 250 ml. of liquid ammonia containing a trace of iron (III) nitrate and is stirred until the resulting blue color disappears. A solution of the enol-ether prepared above, in 100 ml. of tetrahydrofuran is added dropwise at −60° C., and the mixture is stirred for an additional hour. 20.4 g. of methyl iodide in 25 ml. of tetrahydrofuran is then added followed by stirring for 2½ hours. A saturated ammonium chloride solution (50 ml.) is then added and the ammonia evaporated. After extraction, the product was dried yielding: cis-19 - ethylidene-3,17 - dimethoxy-17α-pregna-3,5-dien-20-yne. If desired, a more pure form of the product can be obtained by splitting the enol-ether by means of acidic hydrolysis. The resulting cis-19-ethylidene-17-methoxy-17α-pregn-4-en-20-yne-3-one is then crystallized from acetone/ether and the more pure product is further enol etherified.

40 mg. of lithium is added to 40 ml. of dry liquid ammonia containing a trace of iron (III) nitrate. The mixture is stirred until the blue color disappears. A solution of 370 mg. cis-19-ethylidene-2,17-dimethoxy-17α-pregna-3,5-dien-20-yne in 10 ml. of tetrahydrofuran is added dropwise at —60°. The reaction mixture is stirred for one hour and a slow stream of bromotrifluoromethane is then bubbled through the mixture. 10 ml. of saturated ammonium chloride solution are then added and the ammonia evaporated. Work-up yields oily cis-19-ethylidene-21-bromo-3,17-dimethoxy-17α-pregna-3,5-dien-20-yne.

The cis - 19-ethylidene-21-bromo-3,17-dimethoxy-17α-pregna-3,5-dien-20-yne is submitted to acidic hydrolysis in analogy to the procedure described in Example 1. Chromatography on the 50-fold amount of silica gel using hexane/acetone (98:2) yields 140 mg. cis-19-ethylidene-21 - bromo - 17 - methoxy-17α-pregn-4-en-20-yn-3-one, M.P. 101–103°.

We claim:
1. A 19-homo-steroid of the formula:

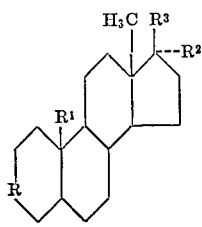

wherein R is selected from the group consisting of a 3-keto-Δ⁴, 3-keto-Δ⁴,⁶, 3-keto-Δ¹,⁴, 3-keto-Δ¹,⁴,⁶, 3-alkoxy-Δ³,⁵, 3-alkoxy-Δ⁴, 3-alkoxy-Δ⁴,⁶, 3-hydroxy-Δ⁴, 3-hydroxy-Δ⁴,⁶, 3-acyloxy-Δ³,⁵, 3-acyloxy-Δ⁴, 3-acyloxy-Δ⁴,⁶ system; R¹ is selected from the group consisting of lower alkyl having at least two carbon atoms and lower alken-1′-yl; R² is selected from the group consisting of halo-lower-alkenyl and halo-lower alkynyl; and R³ is selected from the group consisting of hydroxy, acyloxy and alkoxy, said acyloxy being a residue of a carboxylic acid selected from the group consisting of saturated aliphatic carboxylic acids, aromatic carboxylic acids and unsaturated aliphatic carboxylic acids wherein the carboxylic acids contain from 2 through 10 carbon atoms and said alkoxy contains from 1 through 8 carbon atoms.

2. The compound of claim 1 which is 19-ethyl-21-chloro-17-hydroxy-17α-pregn-4-en-20-yn-3-one.

3. The compound of claim 1 which is cis-19-ethylidene-21-chloro-17-hydroxy-17α-pregn-4-en-20-yn-3-one.

4. The compound of claim 1 which is trans-19-ethylidene-21-chloro-17-hydroxy-17α-pregn-4-en-20-yn-3-one.

5. The compound of claim 1 which is 19-methylene-21-chloro-17-hydroxy-17α-pregn-4-en-20-yn-3-one.

6. The compound of claim 1 which is cis-19-ethylidene-17β - hydroxy - 17 - (trifluoro-1-propynl)-androst-4-en-3-one.

7. The compound of claim 1 which is cis-19-ethylidene-21 - chloro - 17 - hydroxy-17α-pregna-1,4-dien-20-yn-3-one.

8. The compound of claim 1 which is trans-19-ethylidene - 21 - chloro - 17-hydroxy-17α-pregna-1,4-dien-20-yn-3-one.

9. The compound of claim 1 which is 19-methylene-21-chloro-17-hydroxy-17α-pregna-1,4-dien-20-yn-3-one.

10. The compound of claim 1 which is 19-ethyl-21-chloro-17-hydroxy-17α-pregna-1,4-dien-20-yn-3-one.

11. The compound of claim 1 which is cis-19-ethylidene - 17β - hydroxy-17-(trifluoro-1-propynyl)-androsta-1,4-dien-3-one.

12. The compound of claim 1 which is cis-19-ethylidene - 21 - chloro-17-hydroxy-17α-pregna-4,6-dien-20-yn-3-one.

13. The compound of claim 1 which is cis-19-ethylidene - 17β - hydroxy-17-(trifluoro-1-propynyl)-androsta-4,6-dien-3-one.

14. The compound of claim 1 which is trans-19-ethylidene - 21 - chloro - 17-hydroxy-17α-pregna-4,6-dien-20-yn-3-one.

15. The compound of claim 1 which is 19-methylene-21-chloro-17-hydroxy-17α-pregna-4,6-dien-20-yn-3-one.

16. The compound of claim 1 which is cis-19-ethylidene - 21 - chloro - 17-hydroxy-17α-pregna-1,4,6-trien-20-yn-3-one.

17. The compound of claim 1 which is trans-19-ethylidene - 21 - chloro - 17-hydroxy-17α-pregna-1,4,6-trien-20-yn-3-one.

18. The compound of claim 1 which is cis-19-ethylidene - 17β - hydroxy-17-(trifluoro-1-propynyl)-androsta-1,4,6-trien-3-one.

19. The compound of claim 1 which is 19-methylene-21-chloro-17-hydroxy-17α-pregna-1,4,6-trien-20-yn-3-one.

20. The compound of claim 1 which is 19-ethyl-21-chloro-17-hydroxy-17α-pregna-4,6-dien-20-yn-3-one.

21. The compound of claim 1 which is 19-ethyl-21-chloro-17-hydroxy-17α-pregna-1,4,6-trien-20-yn-3-one.

22. The compound of claim 1 which is 19-methyl-21-chloro-17-hydroxy-17α-pregn-4-en-20-yn-3-one.

23. The compound of claim 1 which is 19-methyl-21-chloro-17-hydroxy-17α-pregna-1,4-dien-20-yn-3-one.

24. The compound of claim 1 which is 19-methyl-21-chloro-17-hydroxy-17α-pregna-4,6-dien-20-yn-3-one.

25. The compound of claim 1 which is cis-19-ethylidene-17-hydroxy-17α-pregn-4-en-20-yn-3-one.

References Cited
UNITED STATES PATENTS

| | | | |
|---|---|---|---|
| 3,141,025 | 7/1964 | Nomine et al. | 260—340.9 |
| 3,275,622 | 9/1966 | Bowers | 260—239.55 |
| 3,309,387 | 3/1967 | Furst et al. | 260—397.5 |

HENRY A. FRENCH, Primary Examiner

U.S. Cl. X.R.
260—397.5, 999